United States Patent
Pan

(10) Patent No.: US 7,160,008 B2
(45) Date of Patent: Jan. 9, 2007

(54) COMPOUND REAR LIGHT DEVICE

(75) Inventor: Ko-Chuh Pan, Tainan (TW)

(73) Assignee: Lucidity Enterprise Co., Ltd., Tainan (TW)

( * ) Notice: Subject to any disclaimer, the term of this patent is extended or adjusted under 35 U.S.C. 154(b) by 42 days.

(21) Appl. No.: 11/127,868

(22) Filed: May 11, 2005

(65) Prior Publication Data

US 2006/0256573 A1   Nov. 16, 2006

(51) Int. Cl.
*B60Q 1/56* (2006.01)

(52) U.S. Cl. .................................. 362/497; 362/545

(58) Field of Classification Search .............. 362/497, 362/498, 499, 545, 800; 40/204
See application file for complete search history.

(56) References Cited

U.S. PATENT DOCUMENTS 4,868,723 A * 9/1989 Kobayashi .................. 362/497
5,934,798 A * 8/1999 Roller et al. ................ 362/497
2002/0196638 A1* 12/2002 Stephens et al. ............ 362/497
2005/0286258 A1* 12/2005 Katase ........................ 362/497

* cited by examiner

*Primary Examiner*—Sandra O'Shea
*Assistant Examiner*—James W Cranson, Jr.

(57) ABSTRACT

A compound rear light device includes a bottom base, a main light base, a backing light base, a license plate light base properly arranged in the interior of the bottom base, and a side light base fixed on an outer side. A main light cover is closed on the bottom base, and a backing light cover is fixed on an opening of the main light cover. A license light cover is closed on a front open side of the bottom base. Then all of the light bases respectively have a circuit board and plural LED sealed in their interior with waterproof glue to function as a single light respectively. Thus all the different lights are clearly separated to shine through respective covers, not to be misread for their functions.

5 Claims, 3 Drawing Sheets

COMPOUND REAR LIGHT DEVICE

BACKGROUND OF THE INVENTION

1. Field of the Invention

This invention relates to a compound rear light device, particularly to one having various lights for indicating different functions and assembled together at the rear side of an vehicle, the various lights consisting respectively of a circuit board and plural LED sealed with waterproof glue to function respectively as a single light, possible to be usable for long. The various lights are separated for clearly indicating different purposes, and their bases are easily replaced for repairing and maintaining.

2. Description of the Prior Art

A conventional compound rear light device is positioned at the rear side of an vehicle, and includes, as shown in FIG. 1, a an opaque case-shaped bottom base 1, a light base 2, a main light cover 3, a license plate light cover 4 and a backing light cover 5.

The bottom base 1 has two holes 11 in a rear portion of a bottom surface, two projections 12 at an upper side and the lower side of the two holes 11, a recess 14 formed around an upper circumferential wall with a large opening in the center portion, four threaded holes 13 spaced apart on the recess 14, with the main light cover 3 closing on the recess 14 with a center opening. A backing light cover 5 is fused with the main light cover 3 by means of supersonic process. The bottom base further has a curved opening 15 in a front side.

The light base 2 is made of a metal, contained in the bottom base 1, having two bolts 21 extending down from the upper surface through the body of the light base 2 to fit through down the holes 11 of the bottom base 1, so that the whole rear light device may be fixed on a license plate. The light base 2 further has two holes 22 spaced apart on the body and at the upper side and the lower side of the two bolts 21, and those four holes 22 fit with four projections 12 of the bottom base 1 to secure the light base 2 with the bottom base 1. Then a main light 23 is fixed on the light base 22 to face to the main light cover 3, and a backing light 24 is fixed on the light base 22 to face the backing light cover 5.

The main light cover 3 is closed on the recess 14 of the bottom base 1, having four holes 31 spaced apart around the outer circumference to face the four threaded holes 13 of the bottom base 1 for screws 32 for threadably securing the main light cover 3 with the bottom base 1.

The license plate light cover 4 is formed with the bottom base 1 as integral by injecting molding process, closing up the curved opening 15 of the bottom base 1.

The backing light cover 5 is fused to close up the opening 33 of the main light cover 3 by means of supersonic process.

However, the conventional rear light device uses the main light 23 to shine through the main light cover 3 to serve as a taillight and a brake light, and through the license plate light cover to serve to lighten the license plate. The backing light 24 serves to indicate the backing motion of the vehicle through the backing light cover 5. Nevertheless, The bottom base 1 containing the main light cover 3 and the baking light cover 5 and the light base 2 is not separated in its hollow interior, so when the main light 23 is lit up, the light beam may pass through the main light cover 3, the license plate cover 4 and the backing light cover 5 at the same time, easily to be misunderstood what light is lit up owing to mixed weak light.

Moreover, the main light 23 and the backing light 24 are formed with traditional lamp bulbs, which give out only weak light beam, apt to give out high heat, and not quite functional.

Further, the main light 23 and the backing light 24 are not sealed to be waterproof, so under hot heat the light covers 3, 4 and 5 may be worn off, fumigated, damaged to result in damage of the main light 23 and the backing light 24.

SUMMARY OF THE INVENTION

The feature of the invention is a bottom base for containing a main light base, a backing light base and a license plate light base in its interior, and a side light base fixed at an outer side. Each light base has a circuit board and plural LED sealed in its interior with waterproof glue to make each light base with the circuit board and the LED integral to function as a single light. Further each light base has its own cover for light beam to pass through to be seen. So all of the different lights can be separately lit up for avoiding misunderstanding in the function.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
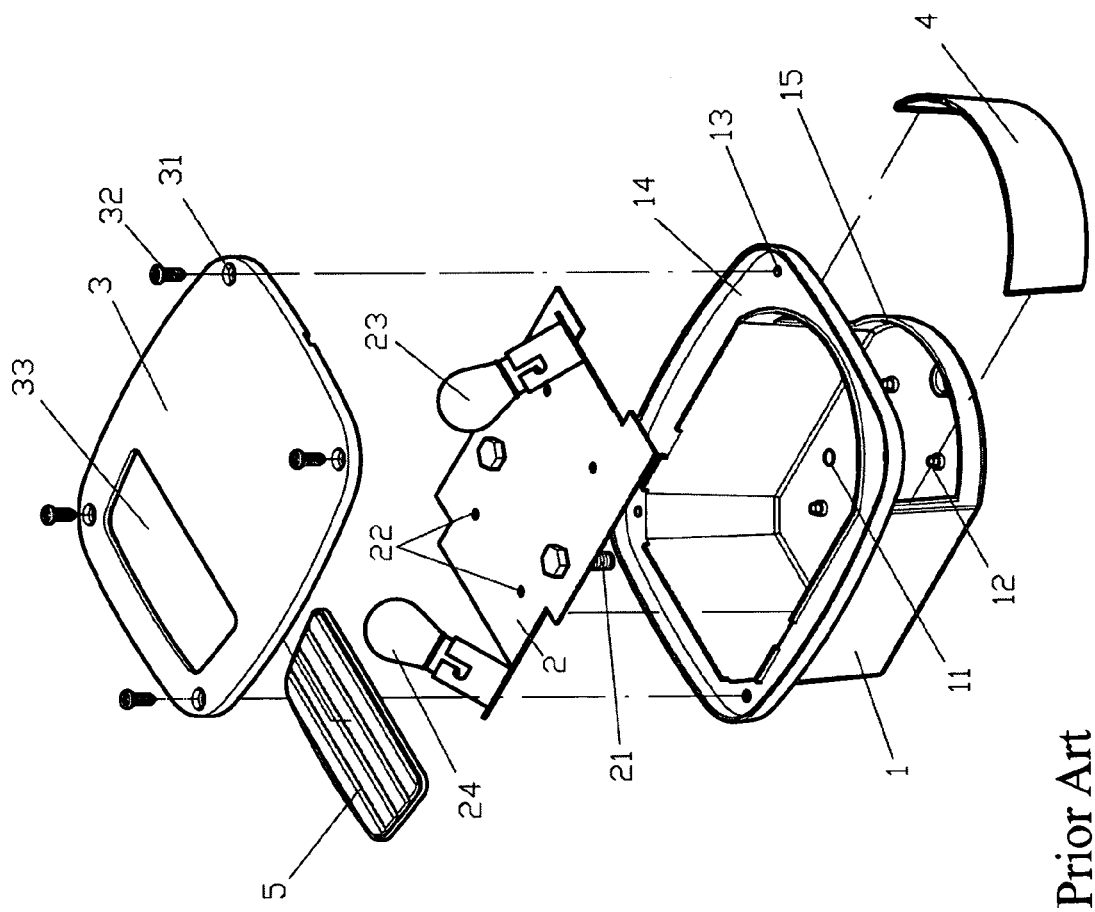
FIG. 1 is an exploded perspective view of a conventional rear light device.
Figure 2:
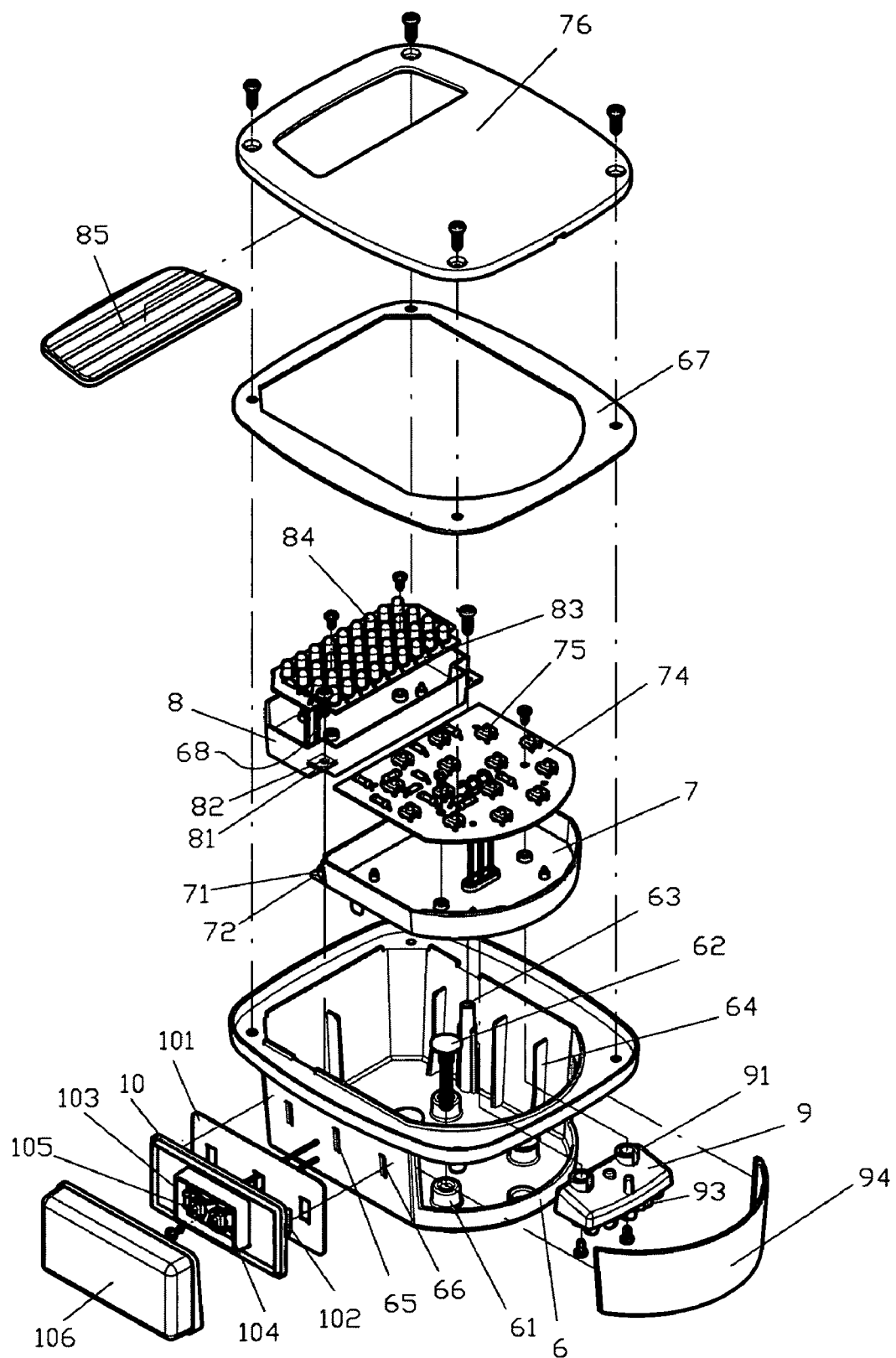
FIG. 2 is an exploded perspective view of a compound rear light device in the present invention.

A preferred embodiment of a compound rear light device in the present invention, as shown in FIG. 2, includes a bottom base 6, a main light base 7, a backing light base 8, a license plate light base 9, a side light base 10 as main components combined together.

The bottom base 6 is opaque and case-shaped, having plural fitting short cylinders 61 formed on a rear portion of the bottom, plural bolts 62 respectively forcefully fitted in the fitting short cylinders 61 and protruding through the bottom to expose out to engage with a license plate frame. The bottom base 6 further has a threaded tube 63 respectively and vertically on a right inner wall and a left inner wall, plural ribs 64 spaced apart on the right and the left inner wall, a wire hole 65 and two holes 66 bored in the left inner wall beside the ribs 64. A waterproof gasket 67 is placed on the upper side of the bottom base 6, and then the main light cover 76 with the backing light cover 85 is placed on the gasket 67. The bottom base 6 further has an opening in the front side closed up by a license plate light cover 94.

Figure 4:
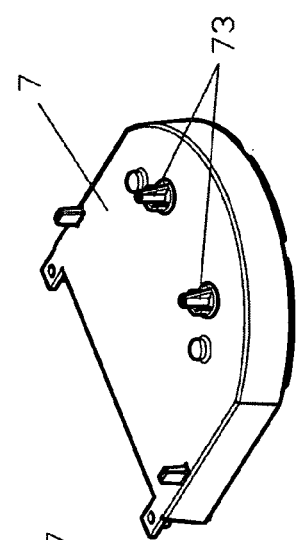
FIG. 4 is a perspective view of fixing rings on the main light base in the present invention.
Figure 3:
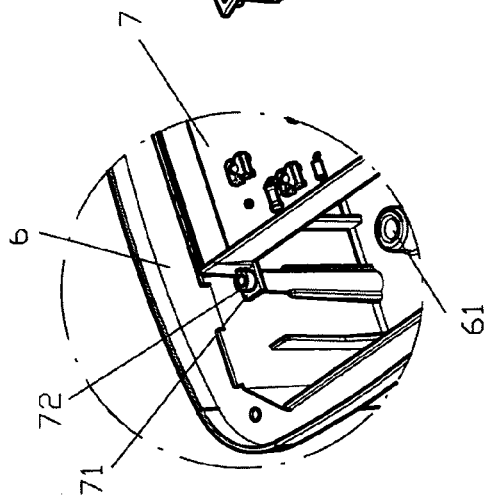
FIG. 3 is a perspective view of a fixing tube of a main light base and a threaded short cylinder of a bottom base in the present invention.
Figure 8:
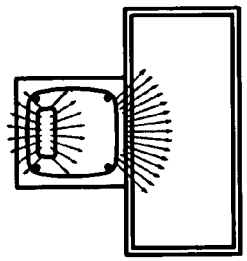
Figure 7:
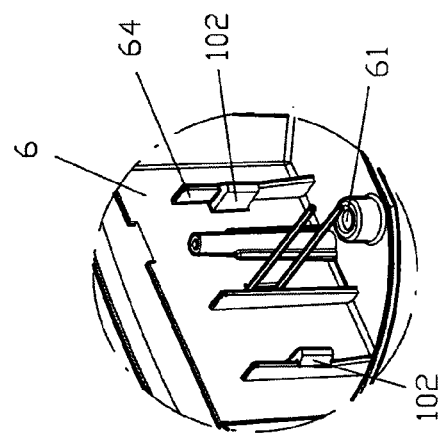
FIG. 7 is a perspective view of two hooks of a side light base fitting in the holes of the bottom base and hooking with the ribs in the present invention; and, FIG. 8 is a side view of the compound rear light device assembled with a license plate frame in the present invention.

The main light base 7 is placed in the bottom base 6, below the main light cover 76 as shown in FIG. 3, having a ring 72 with an ear 71 at two sides of the rear side to fit an upper end of the threaded tubes 63 of the bottom base 6. The main light base 7 further has two fixing projections 73 spaced apart on a lower surface, as shown in FIG. 4, and a circuit board 74 and plural LED 75 are fixed in the main light base 7, sealed by waterproof glue to make them as integral to function as a single light.

Figure 6:
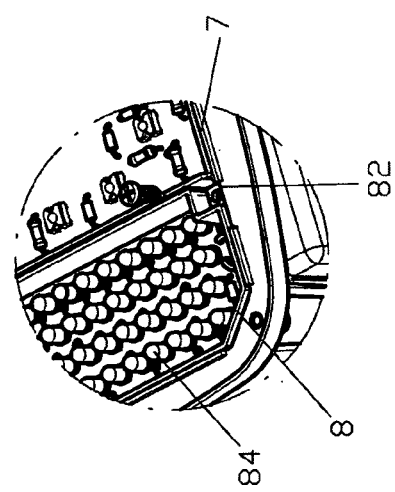
FIG. 6 is a perspective view of the license plate light base combined with the main light base in the present invention.

The backing light base 8 is opaque and case-shaped, placed in an upper portion of the main light base 7, covered by the backing light cover 85 fitted in an opening of the main light cover 76, having an ear 81 with a center hole 82 respectively at two sides to face the two rings 72 of the main light base 7, as shown in FIG. 6. Further, a circuit board 83 and plural LED 84 are fixed in the backing light base 8 and sealed with waterproof glue to make them as integral to function as a single light.

Figure 5:
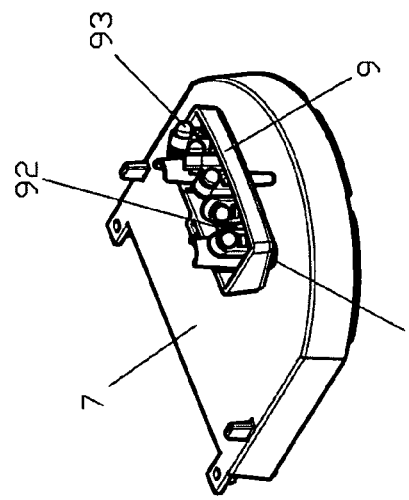
FIG. 5 is a perspective view of the fitting projections of the main light base and holes in a backing light base in the present invention.

The license plate light base 9 is opaque and shaped as a rectangular case with four sloped down sides, as shown in FIG. 5, positioned under the main light base 7, facing the license plate light cover 94, having two C-shaped fitting tubes 91 to fit with the fixing projections 73 of the main light base 7. Further, a circuit board 92 and plural LED 93 are fixed in the license plate light base and sealed with waterproof glue to make them as integral to function as a single light.

The side light base 10 is opaque and shaped as a rectangular case, positioned on an outer side of the bottom base 6, having a waterproof gasket 101, a projecting hook 102 at two sides of the inner wall to fit in the holes 66 of the bottom base 6 and hooking with the ribs 64 to keep stably the side light base 10 with the bottom base 6. The side light base 10 further has a walled chamber 103 on the outer side for fixing a circuit board 104 and plural LED 105 therein and them sealed with waterproof glue, and then adhered a side light cover 106 by means of supersonic process, to become as integral to function as a single light.

In assembling, firstly, the license plate light base 9 is combined with the main light base 7 by means of the C-shaped fitting-tubes 91 fitting with the fixing projections 73, and then the main light base 7 together with the license plate light base 9 is combined with the bottom base 6 by means of two rings 72 fitting with the threaded short cylinders 63. Then the backing light base 8 is combined with the main light base 7 by fitting the two holes 82 with the two rings 72, and then threadably fastened together by two bolts 68, Then the main light cover 76 is closed on the upper side of the bottom base 6, and the waterproof gasket 101 is placed in the side light base 10, and then the two hooks 102 are inseted in the holes 66 of he bottom base 6 and also hooked with the ribs 64 stably. Thus, the compound rear light device is finished in its assembly.

Therefore, the warning indicating light of the tail light and the brake light, the backing light, the side light, and the license plate light are clearly divided and separately lit up in case of need, easily indicating their functions, in addition provided with waterproof function, and easy disassembling.

While the preferred embodiment of the invention has been described above, it will be recognized and understood that various modifications may be made therein the appended claims are intended to cover all such modifications that may fall within the spirit and scope of the invention.

What is claimed is:

1. A compound rear light device comprising:

an opaque bottom base of a square case shape, containing a main light base, a backing light base, a license plate light base in its interior, a side light base fixed at an outer side of said bottom base, said bottom base having bolts fitting through its bottom to screw with a license plate frame for securing said bottom base with said license plate frame, a waterproof gasket placed on an upper circumference of said bottom base, a main light cover with a backing light cover closing up the upper open side of said bottom base, and a license plate light cover closing up its front side;

said main light base being opaque, case-shaped, positioned in said bottom base and facing said main light cover, said main light base having a circuit board and plural LED fixed in its hollow interior and then sealed with waterproof glue therein to make them as integral with said light base to function as a single light;

said backing light base being opaque, case-shaped, positioned in said bottom base at an inner side of said main light base and facing to said backing light cover, said backing light base containing a circuit board and plural LED sealed with waterproof glue therein to make them as integral with said backing light base to function as a single light;

said license plate light base being opaque and of a rectangular and sloped sided case shape, positioned in said bottom base under said main light base and facing to a license plate light cover closing up a front side of said bottom base, said license plate light base containing a circuit board and plural LED sealed with waterproof glue therein to make them as integral with said license plate light base to function as a single light; and, said side light base being opaque and rectangular case-shaped, positioned on an outer vertical side of said bottom base, said side light base having a waterproof gasket in an inner side, a walled hollow chamber formed in an outer side, a circuit board and plural LED fixed in said walled hollow chamber and sealed with waterproof glue, a side light base cover closing up said side light base and fused together to make them as integral to function as a single light.

2. The compound rear light device as claimed in claim 1, wherein said bottom base further has a threaded tube provided respectively and vertical on two inner sidewalls, a ring with an ear provided at two sides of a rear wall, said two rings located just on said threaded tube of said bottom base and threadably connected with each other by screws.

3. The compound rear light device as claimed in claim 1, wherein said backing light base further has an ear with a center hole bored respectively at a lower section of two opposite sides, said center holes aligned to said two rings of said main light base for screws to threadably connecting with said two threaded tubes of said bottom base.

4. The compound rear light device as claimed in claim 1, wherein said bottom base further has plural ribs vertically on said two inner walls at two sides of each said threaded tube, and two holes in the left sidewall beside said ribs, said side light base has a projecting hook respectively on an inner side to hook with said two holes of said bottom base and also with said ribs to keep said side light base secured stably with said bottom base.

5. The compound rear light device as claimed in claim 1, wherein said main light base further has two fitting projections spaced apart on a front portion of a lower surface, and said license plate light base further has two C-shaped tubes spaced apart on a rear portion of an upper surface, said C-shaped tubes fitting tightly with said two fitting projections to combine said side light base with said main light base.

* * * * *